United States Patent
Toda et al.

(10) Patent No.: US 6,183,118 B1
(45) Date of Patent: Feb. 6, 2001

(54) AUTOMATIC LEVELING APPARATUS FOR USE WITH AUTOMOBILE HEADLAMPS

(75) Inventors: Atsushi Toda; Hideaki Takeuchi, both of Shizuoka (JP)

(73) Assignee: Koito Manufacturing Co., Ltd., Tokyo (JP)

( * ) Notice: Under 35 U.S.C. 154(b), the term of this patent shall be extended for 0 days.

(21) Appl. No.: 09/371,896

(22) Filed: Aug. 11, 1999

(30) Foreign Application Priority Data

Sep. 29, 1998 (JP) .................................................. 10-274859

(51) Int. Cl.[7] ...................................................... B60Q 1/00
(52) U.S. Cl. .......................... 362/465; 362/466; 362/460; 362/459; 315/82; 315/360
(58) Field of Search ..................................... 362/459, 460, 362/465, 466, 467; 33/288, 335; 340/468; 315/77, 79, 80, 82, 149, 158, 360, 362

(56) References Cited

U.S. PATENT DOCUMENTS

| | | | |
|---|---|---|---|
| 4,891,559 | * | 1/1990 | Matsumoto et al. .................... 315/82 |
| 5,876,113 | * | 5/1999 | Gotoh .................................. 362/466 |
| 5,877,680 | | 3/1999 | Okuchi et al. ....................... 340/468 |
| 5,907,196 | * | 5/1999 | Hayami et al. ...................... 307/10.8 |

FOREIGN PATENT DOCUMENTS

| | | | |
|---|---|---|---|
| 0 803 401 | 10/1997 | (EP) | .............................. B60Q/1/115 |
| 2 309 774 | 8/1997 | (GB) | .............................. B60Q/1/115 |

* cited by examiner

Primary Examiner—Sandra O'Shea
Assistant Examiner—John Anthony Ward
(74) Attorney, Agent, or Firm—Sughrue, Mion, Zinn, Macpeak & Seas, PLLC (57) ABSTRACT

An automobile headlamp automatic leveling apparatus is provided. A headlamp whose light axis is tilted upward and downward in relation to a vehicle body by means of an actuator, a control unit for controlling the operation of the actuator, vehicle speed detection means for detection of the speed of the vehicle; and pitch angle detection means for detecting a pitch angle of the vehicle are included in the leveling apparatus. The control unit controls the operation of the actuator on the basis of a detected pitch angle such that the light axis of the headlamp maintains a constant, predetermined angle in relation to the road surface. While the vehicle is stationary, the control unit controls operation of the actuator at the time of illumination of the headlamp. Subsequently, while the vehicle remains stationary, the operation of the actuator is controlled at given time intervals which are counted by an interval timer.

10 Claims, 7 Drawing Sheets

AUTOMATIC LEVELING APPARATUS FOR USE WITH AUTOMOBILE HEADLAMPS

BACKGROUND OF THE INVENTION

1. Field of the Invention

The present invention relates to an automatic leveling apparatus which automatically tilts the light axis of a headlamp in such a direction so as to offset a pitch angle that corresponds to an inclination of a vehicle in the longitudinal direction thereof. This operation will be hereinafter referred to as an "automatic leveling operation". In particular, the present invention is related to an automatic leveling apparatus for automatically controlling the alignment of the light axis of the headlamp in a vertical direction on the basis of a pitch angle obtained while the vehicle is stationary.

2. Description of the Related Art

A headlamp of this type is built so that, for example, a reflector equipped with a light source is supported on a lamp body so as to be tiltable about a horizontal axis, and the light axis of the reflector (headlamp) is tiltable about the horizontal axis by means of an actuator.

A conventional automatic leveling apparatus comprises pitch angle detection means and a vehicle speed sensor, both of which are mounted on a vehicle, and a control section for controlling operation of an actuator on the basis of detection signals output from the detection means and the sensor. The light axis of a headlamp (reflector) is controlled so as to constantly remain in a predetermined position relative to the road surface.

Automatic leveling comprises dynamic automatic leveling for constantly effecting an automatic leveling operation either while the vehicle is travelling or stationary, and static automatic leveling for effecting an automatic leveling operation while the vehicle is stationary.

The conventional automatic leveling apparatus is arranged so as to perform a leveling operation in real time in response to a change in the orientation of a vehicle stemming from acceleration and deceleration during travel and a change in the weight of the vehicle stemming from loading and unloading of cargo on or from the vehicle during halts, regardless of whether or not the vehicle is traveling or stationary. For this reason, the actuator is operated a very large number of times, thus consuming a large amount of power. Further, components constituting a drive mechanism, such as a motor and gears, are required to have great durability, thus adding to the overall cost of the apparatus.

SUMMARY OF THE PRESENT INVENTION

The present invention has been conceived in view of the foregoing drawbacks in the related art, and the object of the present invention is to provide an inexpensive automobile headlamp automatic leveling apparatus which can diminish the frequency of operation of the actuator and can be used for a long period of time.

To achieve the object, the present invention provides an automobile headlamp automatic leveling apparatus which includes a headlamp whose light axis is tilted upward and downward in relation to a vehicle body by means of an actuator; a control unit for controlling the operation of the actuator; vehicle speed detection means for detection of the speed of the vehicle; and pitch angle detection means for detecting a pitch angle of the vehicle. The control unit controls the operation of the actuator on the basis of a detected pitch angle such that the light axis of the headlamp maintains a constant, predetermined angle in relation to the road surface. The control unit effects single control of operation of the actuator at the time of illumination of the headlamp while the vehicle is stationary, and while the vehicle is stationary, the operation of the actuator is controlled at given time intervals counted by an interval timer.

While the vehicle is stationary, the control of operation of the actuator is commenced at predetermined time intervals under the condition that the headlamp is illuminated. Accordingly, the number of times the actuator is operated is smaller than conventional apparatuses, resulting in reduced power conservation. Further, the constituent members of a drive mechanism undergo less abrasion.

According to a second aspect of the present invention, the automobile headlamp automatic leveling apparatus as defined in the first aspect is further characterized in that first control of operation of the actuator is performed simultaneously with illumination of the headlamp.

The illuminating action of the headlamp serves as a leveling switch, thus affording great convenience to the driver.

According to a third aspect of the present invention, the automobile headlamp automatic leveling apparatus is further characterized in that the interval between operations of the actuator is set so as to become longer than the maximum time required by the actuator to perform a single leveling operation.

If the interval between a previous control operation and a subsequent control operation is shorter than the maximum time required by the actuator to activate the actuator, the actuator shifts to the next operating state before reaching a target value. After the actuator has reached the target value without fail according to the previous control, the actuator is activated according to the next control. Thus, the frequency of activation of the actuator is reduced, thereby increasing the longevity of the actuator compared to the related art.

Further, since the interval between the operations of the actuator is increased, a change arising in pitch angle during an interval between a previous control operation and the next control operation can be omitted without involvement of operation of the actuator. More specifically, all the operations performed between the intervals are consolidated into the operation of the actuator in the next control operation. Accordingly, the frequency of activation of the actuator is reduced.

According to a fourth aspect of the present invention, the automobile headlamp automatic leveling apparatus is further characterized in that, if the actuator is brought into an uncontrolled state after the control of operation of the actuator has been started, the actuator continues to operate by only the amount of operation instructed by the control unit immediately before the actuator is brought into an uncontrolled state.

Even if the actuator is brought into an uncontrolled state as a result of extinction of the headlamp or traveling of the vehicle, the actuator is not stopped before completion of operation of the actuator. The actuator is activated to a predetermined position corresponding to the pitch angle without being interrupted. Accordingly, the light axis of the headlamp is prevented from being changed to an unintended position.

According to a fifth aspect of the present invention, the automobile headlamp automatic leveling apparatus is further characterized in that, on the basis of the pitch angle detected by the pitch angle detection means, the control unit is arranged so as to calculate the amount of control operation required to activate the actuator, even during the interval period of operation of the actuator and regardless of whether or not the headlamp is illuminated.

Even in an unilluminated state or an interval period, in either of which the operation of the actuator is not controlled, the pitch angle detected by the pitch angle detection means is taken into the control unit at all times, where the pitch angle is processed as the amount of control operation. All the pitch angles taken into the control unit are utilized as control data, thus enabling utilization of many pitch angles as control data. Accordingly, a proper leveling operation associated with correct detection of a vehicle's orientation (pitch angle) becomes feasible.

According to a sixth aspect of the present invention, the automobile headlamp automatic leveling apparatus is further characterized in that the control unit comprises a storage section for storing a pitch angle detected by the pitch angle detection means regardless of whether or not the headlamp is illuminated, and immediately after the headlamp has been illuminated, the control unit controls the operation of the actuator on the basis of the pitch angle stored in the storage section immediately before illumination of the headlamp.

A leveling operation is started under condition that the headlamp is illuminated. Immediately after illumination of the headlamp, the actuator is controlled on the basis of the pitch angle stored immediately before illumination of the headlamp, thus shortening the time required for the leveling operation immediately after illumination of the headlamp.

According to a seventh aspect of the present invention, the automobile headlamp automatic leveling apparatus is further characterized in that, if a signal is not input to the control unit from the vehicle speed detection means over a predetermined period of time while the vehicle is stationary, the control unit stops operation of the actuator.

A signal is not input to the control unit from the vehicle speed detection means for a predetermined period of time, because the vehicle speed sensor operates falsely or the vehicle is actually stopped for a long period of time. In either case, the control of operation of the actuator is not required. Hence, the control unit stops the operation of the actuator, thus avoiding useless activation of the actuator.

According to an eighth aspect of the present invention, the automobile headlamp automatic leveling apparatus is further characterized in that when a signal is input to the control unit from the vehicle speed detection means while the control of operation of the actuator is suspended, the control unit releases the actuator from a suspended state and controls the operation of the actuator on the basis of the pitch angle stored in the storage section of the control unit immediately before resumption of operation of the actuator or immediately before detection of a traveling state.

As in the case of the vehicle shifting to a traveling state after having been held in a stationary state for a long period of time, the vehicle may travel while the control of operation of the actuator is suspended. In such a case, the actuator is immediately released from a suspended state, and the control of operation of the actuator is resumed immediately. At the beginning of resumption of the actuator, the operation of the actuator is controlled on the basis of the pitch angle stored in the storage section immediately before resumption of operation of the actuator or immediately before detection of a traveling state of the vehicle. Simultaneous with resumption of operation of the actuator, an appropriate leveling operation can be performed without delay.

According to a ninth aspect of the present invention, the automobile headlamp automatic leveling apparatus is further characterized in that the control unit controls the operation of the actuator only during stable travel on the basis of the pitch angle obtained while the vehicle is in a stable traveling state.

The orientation of the vehicle achieved while the vehicle travels stably is substantially identical with that achieved while the vehicle is stationary and can be readily detected. Further, the pitch angle obtained while the vehicle is in a stable traveling state is substantially identical with that obtained while the vehicle is stationary. Even if the operation of the actuator is controlled on the basis of the pitch angle obtained while the vehicle is in a stable traveling state, no problem arises. When the vehicle is stationary such that the wheels on one side of the vehicle are on the curb, an erroneous pitch angle is detected. So long as the thus-detected pitch angle is corrected so as to become equal to the pitch angle obtained while the vehicle is traveling (i.e., the operation of the actuator is controlled on the basis of the pitch angle obtained while the vehicle travels stably), a leveling operation can be prevented from being performed on the basis of the erroneous pitch angle data obtained while the vehicle is stationary.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE PREFERRED EMBODIMENTS

Preferred modes for embodying the present invention will be described by reference to examples.

Figure 1:
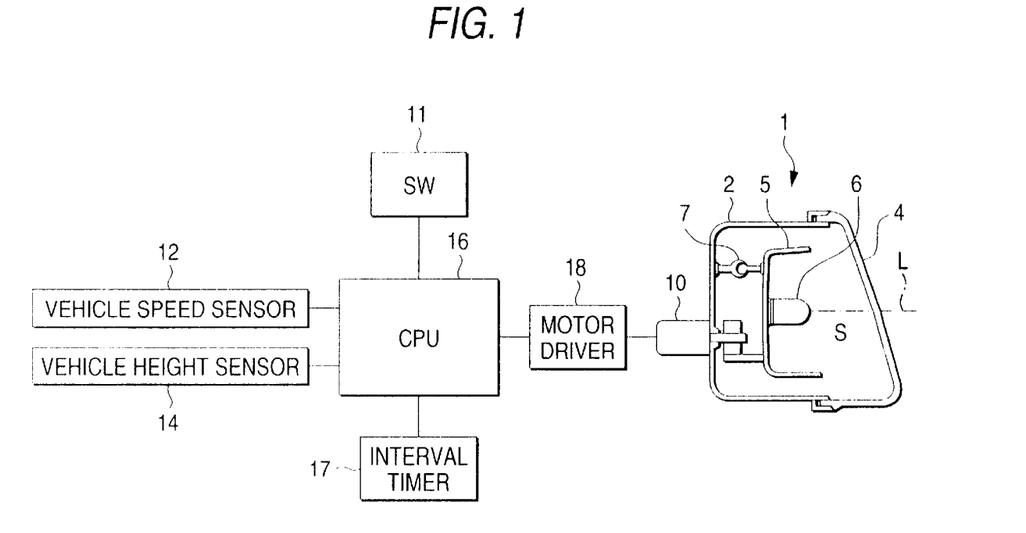
FIG. 1 is a diagram showing the overall configuration of an apparatus for automatically leveling automobile headlamps according to a first embodiment of the present invention.
Figure 2:
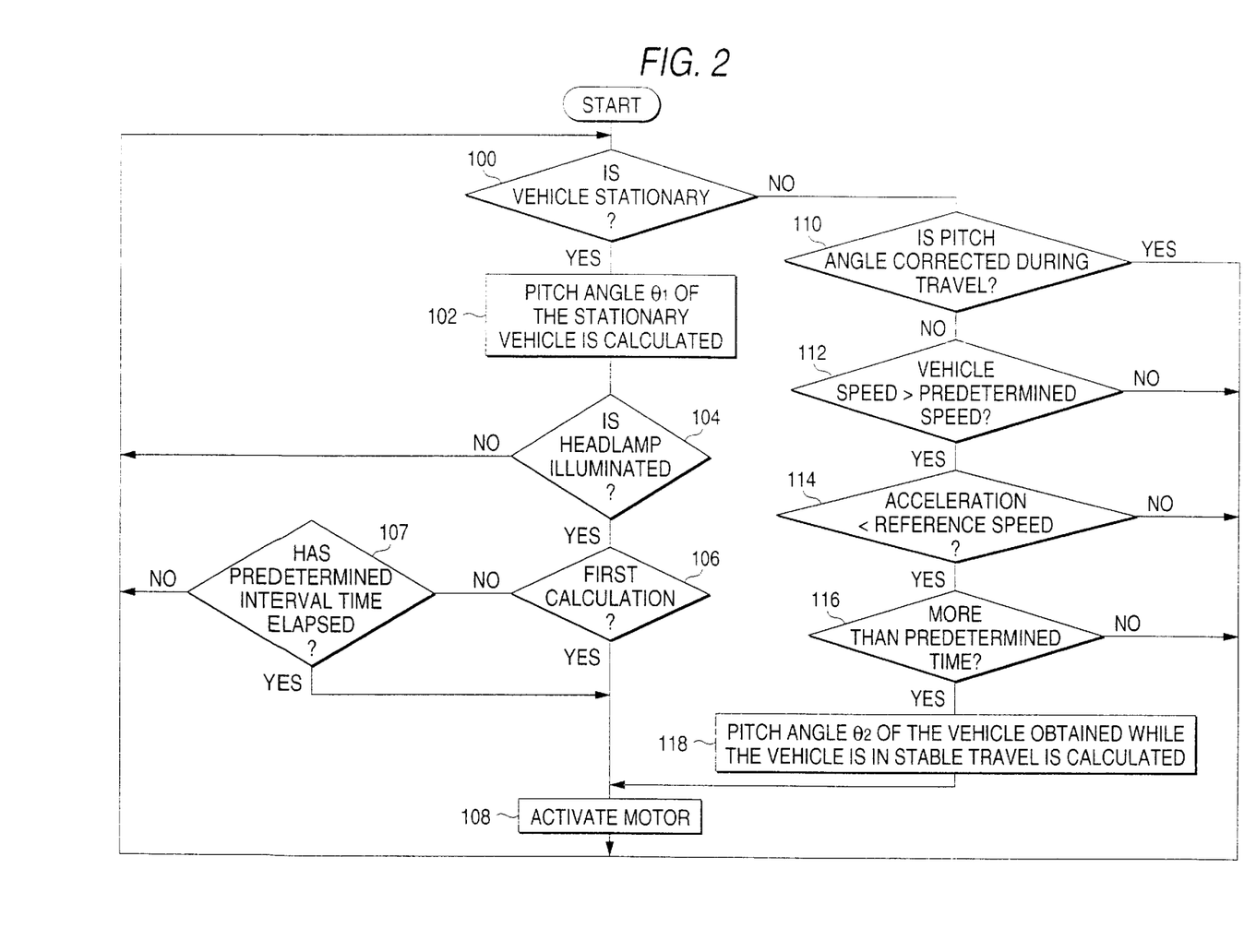
FIG. 2 shows a flowchart pertaining to a control unit of the automatic leveling apparatus.
Figure 3:
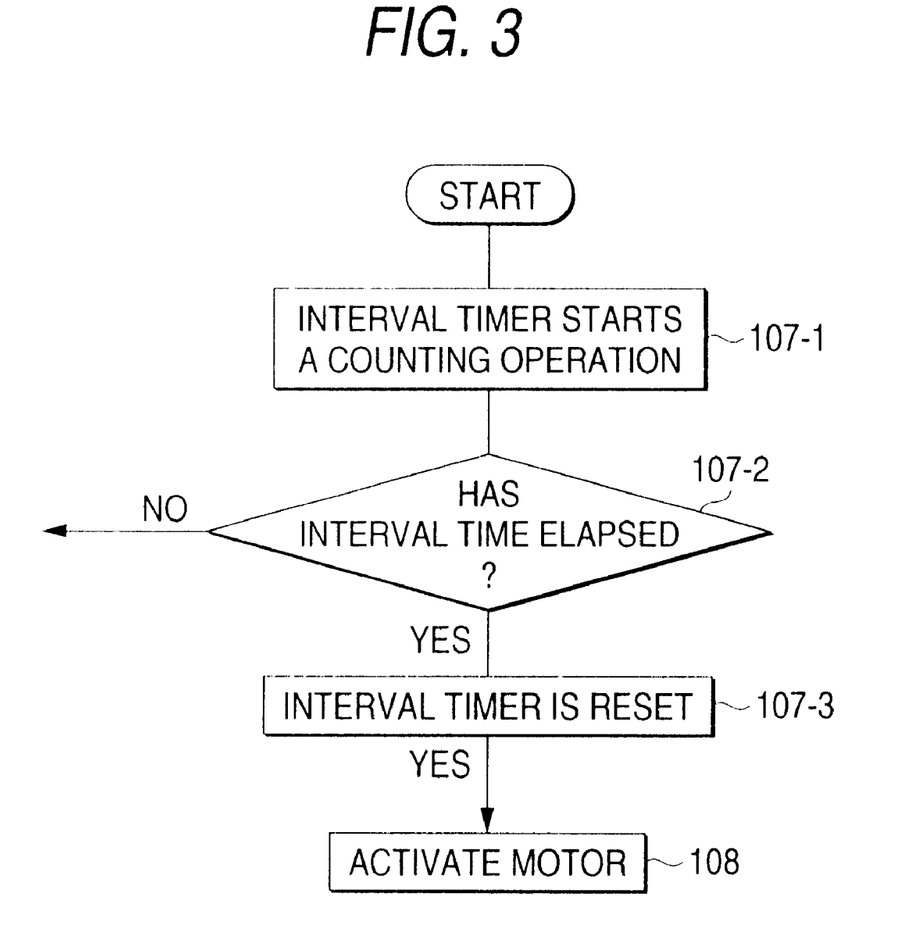
FIG. 3 shows a detailed flow of operation relating to an interval control step.

FIGS. 1 through 3 show a first embodiment of the present invention. FIG. 1 shows the overall configuration of an apparatus for automatically leveling automobile headlamps according to the first embodiment; FIG. 2 shows a flowchart pertaining to a control unit of the automatic leveling apparatus; and FIG. 3 shows a detailed flow of operation relating to an interval control step.

Reference numeral 1 shown in FIG. 1 designates an automobile headlamp, and a front lens 4 is attached to the front opening section of a lamp body 2, thus constituting a lamp chamber S. A parabolic reflector 5 having a light bulb 6 fitted therein is supported in the lamp chamber S so as to be tiltable about a horizontal pivotal axis 7 (an axis perpendicular to the drawing sheet of FIG. 1). The reflector 5 can be pivoted by means of a motor 10 which serves as an actuator.

An automatic leveling apparatus for use with the headlamp 1 includes the motor 10 serving as an actuator for pivoting the light axis L of the headlamp 1 upward or downward; a headlight ON/OFF switch 11 for turning on or off the headlamp 1; a vehicle speed sensor 12 serving as vehicle speed detection means for detecting the speed of a vehicle; and a vehicle height sensor 14 constituting a part of the means for detecting a pitch angle of the vehicle. A CPU 16 is included in the apparatus to compute the speed and pitch angle of the vehicle on the basis of signals output from the vehicle speed sensor 12 and the vehicle height sensor 14, and outputs a signal for driving the motor 10, according to preset conditions, to a motor driver 18. An interval timer 17 is included for setting a timing at which the motor 10 is driven.

Upon receipt of a signal from the vehicle speed sensor 12, the CPU 16 computes the speed and acceleration of the vehicle on the basis of the signal, thus determining whether or not the vehicle is stationary or travelling. Further, if the vehicle is determined to be traveling, the CPU 16 determines whether or not the vehicle travels stably.

Upon receipt of a signal from the vehicle height sensor 14, the CPU 16 calculates the inclination of the vehicle in a longitudinal direction (i.e., the pitch angle of the vehicle) from the signal corresponding to the amount of displacement of the vehicle's suspensions. In a case where the vehicle height sensor comprises two sensors, i.e., a sensor disposed on a set of front wheels and another sensor provided on a set of rear wheels, a pitch angle can be determined from the amount of displacement of vehicle height in the longitudinal direction and the length of a wheel base. In contrast, in a case where the vehicle height sensor comprises a single sensor disposed on either a set of front wheels or a set of rear wheels, a pitch angle can be estimated from the amount of variation in the vehicle height. The CPU 16 outputs, to the motor driver 18, a signal for pivoting the light axis L through a predetermined angle so as to cancel the pitch angle.

At the time of detection of a signal from the vehicle height sensor 14, the CPU 16 performs an operation by use of a comparatively high sampling time while the vehicle is stationary. While the vehicle is traveling, in order to exclude external perturbations, the pitch angle of the vehicle is calculated only when the vehicle speed is equal to or faster than a reference value, an acceleration is equal to or smaller than a reference value, and this state (i.e., the vehicle speed is equal to or greater than the reference speed and the acceleration of the vehicle is equal to or smaller than the reference value) is in effect for more than a predetermined continuous period of time.

When the vehicle travels over poor road conditions that include characteristics causing external perturbations or disturbances, such as irregularities on the road surface, the vehicle cannot travel at a speed of more than 30 km/h. An appropriate measure for preventing hard acceleration or deceleration, which would otherwise change the orientation of the vehicle, is to limit the acceleration of the vehicle to 0.5 m/s$^2$ or less. Stable travel is achieved under conditions of a travel speed of 30 km/h or more and an acceleration of 0.5 m/s$^2$ or less, continuing for more than three seconds. Since the pitch angle of the vehicle is calculated only when the above conditions are satisfied, detection of a sporadic, abnormal value or influence of such an abnormal value on the calculation of a pitch angle is prevented.

The CPU 16 determines whether the headlight ON/OFF switch is in an ON or OFF position. During the halt of the vehicle, the CPU 16 outputs a signal to the motor driver 18 so as to drive the motor 10 only when the headlight ON/OFF switch 11 is in an ON position.

Further, only after a predetermined interval time set in the interval timer 17 has elapsed, the CPU 16 outputs a signal to the motor driver 18 so as to drive the motor 10.

More specifically, the light axis of the headlamp 1 is tilted within a fixed range, and hence the maximum amount of time that the motor 10 requires for performing a single leveling operation is also fixed. If the time interval between operations of the motor 10 is shorter than the maximum time required by the motor 10 to perform a single leveling operation, the motor 10 is frequently driven so as to follow variations in the vehicle's orientation (or pitch angle) stemming from loading or unloading of passengers. In this case, the light axis L (or motor 10) is repeatedly rotated forward, reversed, and stopped before reaching the target position, thereby disadvantageously shortening the life of the motor 10.

To prevent such a problem, the interval is set to be longer than the maximum time required by the motor 10 to perform a signal leveling operation, and thus, the target position of the light axis remains unchanged during the leveling operation (or during the operation of the motor 10).

Next, the control of operation of the motor 10 by the CPU 16 that acts as a control unit is described according to a flowchart shown in FIG. 2.

In step 100, the CPU 16 determines, on the basis of a signal output from the vehicle speed sensor 12, whether or not the vehicle is stationary. If YES (stationary) is selected, a pitch angle $\theta_1$ ($\theta_{11}$) of the stationary vehicle is calculated in step 102. In step 104, on the basis of a signal output from the headlamp ON/OFF switch 11, a determination is made as to whether or not the headlamp is illuminated. If YES (illuminated) is selected, processing proceeds to step 106, where a determination is made as to whether or not the calculation of the pitch angle represents the first calculation. Specifically, in step 106, a determination is made as to whether or not the calculation of the pitch angle in step 102 represents the first calculation. If YES (the first calculation) is selected, in step 108 a signal is output to the motor driver 18 on the basis of the pitch angle $\theta_1$ ($\theta_{11}$) in order to activate the motor 10, and processing returns to step 100.

If NO is selected in step 106 (if the calculation of a pitch angle in step 102 is the second calculation), processing proceeds to step 107. On the basis of a signal output from the interval timer 17, a determination is made as to whether or not a predetermined time has elapsed since the actuation of the motor 10 started. If NO is selected in step 107 (a predetermined time has not yet elapsed), processing returns to step 100. In contrast, if YES is selected in step 107 (i.e., a predetermined time has already elapsed), processing proceeds to step 108. A signal is output to the motor driver 18 so as to control the motor 10 on the basis of the pitch angle $\theta_1$ ($\theta_{11}$) calculated in step 102 at that time. Processing then returns to step 100.

FIG. 3 shows a flowchart relating to step 107 (i.e., the interval control step).

First, in step 107-1 the interval timer 17 starts a counting operation. In step 107-2, a determination is made as to whether or not the interval time (e.g., five seconds) has elapsed. If NO is selected in step 107-2 (five seconds have not yet elapsed), processing returns to step 100. In contrast, if YES is selected in step 107-2 (five seconds have elapsed), the interval timer 17 is reset in step 107-3, and processing proceeds to step 108.

Referring back to FIG. 2, if NO (traveling) is selected in step 100, in step 110 the CPU 16 determines whether or not the pitch angle is corrected during travel of the vehicle. If NO is selected in step 110 (i.e., the pitch angle is not corrected during travel), in step 112 the CPU 16 determines whether or not the vehicle speed exceeds a reference speed (e.g., 30 km/h). If YES is selected in step 112 (the vehicle speed exceeds 30 km/h), in step 114 the CPU 16 determines whether or not the acceleration is less than a reference acceleration (e.g., 0.5 m/s$^2$). If YES (acceleration is less than 0.5 m/s$^2$) is selected in step 114, in step 116 the CPU 16 determines whether or not the vehicle speed of more than 30 km/h and the acceleration of less than 0.5 m/s$^2$ are continued for more than a predetermined time (e.g., three seconds). If YES is selected in step 116 (i.e., such a state is continued for more than three seconds), processing proceeds to step 118, where a pitch angle $\theta_2$ of the vehicle obtained while the vehicle is in a stable travel is calculated. In step 108, a signal is output to the motor driver 18 so as to activate the motor 10 on the basis of the pitch angle $\theta_2$ that is obtained while the vehicle is in a stable drive state. Processing then returns to step 100.

If YES is selected in step 110 (the pitch angle is already corrected during travel, as in the case where the actuator is driven on the basis of the pitch angle $\theta_2$ that is obtained while the vehicle is traveling), or if NO is selected in one of the steps 112, 114, and 116 (i.e., when the vehicle speed is smaller than the reference value of 30 km/h, the acceleration of the vehicle is greater than the reference value of 0.5 m/s$^2$, or such a state is not continued for more than three seconds), processing returns to step 100.

Figure 4:
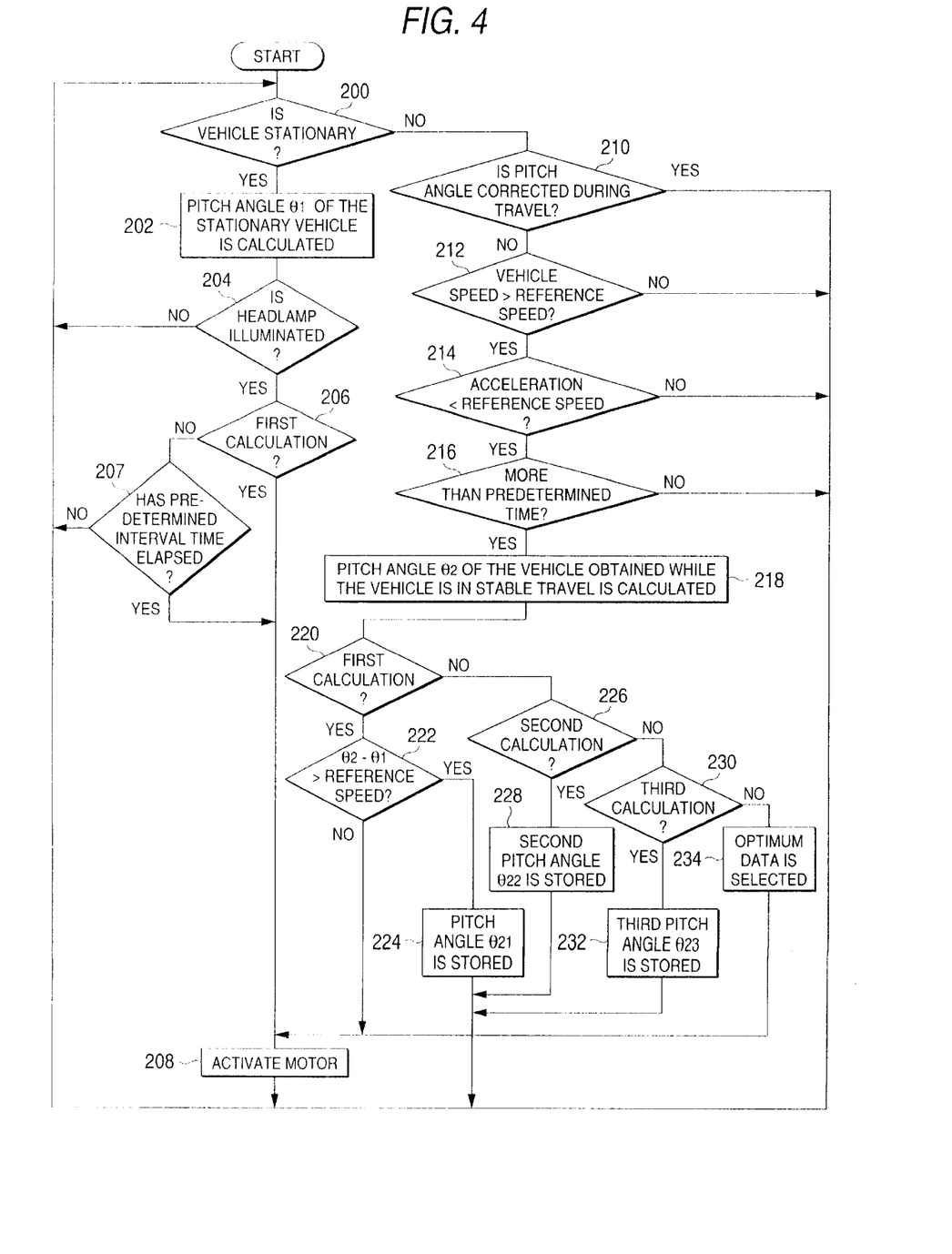
FIG. 4 is a flowchart showing a flow of operation relating to a control unit which serves as the principal section of a headlamp automatic leveling apparatus according to a second embodiment of the present invention.

FIG. 4 is a flowchart showing a flow of operation relating to a control unit which serves as the principal section of a headlamp automatic leveling apparatus according to a second embodiment of the present invention.

The second embodiment differs from the first embodiment in that when the difference between the pitch angles $\theta_1$ and $\theta_2$ is smaller than the predetermined reference value, the pitch angle $\theta_2$ is used as control data. If the difference ($\theta_2-\theta_1$) is greater than the predetermined reference value, the pitch angel $\theta_2$ is detected two or more times while the vehicle is in a stable traveling state. A mean angle of the thus-detected pitch angles $\theta_2$, or a pitch angle which most frequently occurs, is used as control data.

Steps 200, 202, 204, 206, 207, and 208 are identical with steps 100, 102, 104, 106, 107, and 108, respectively. Further, steps 210, 212, 214, 216, and 218 are identical with steps 110, 112, 114, 116, and 118, respectively. Hence, a repetition of the explanations of these steps is omitted here.

Processing shifts from step 218 to step 220, in which the CPU 16 determines whether or not the calculation of step 218, of the pitch angle $\theta_2$ while the vehicle is in a stable traveling state, represents the first calculation. If YES is selected in step 220 (i.e., the calculation of the pitch angle $\theta_2$ represents the first calculation), processing proceeds to step 222. The CPU 16 then determines whether or not a difference between the pitch angles $\theta_1$ ($\theta_{1n}$) and $\theta_2$ is greater than the predetermined reference value (0.1 degree). If NO is selected (i.e., the difference is less than the predetermined reference value of 0.1 degree), in step 208 a signal is output to the motor driver 18 on the basis of the pitch angle $\theta_2$ in order to activate the motor 10. Processing then returns to step 200.

If YES is selected in step 222 (i.e., the difference between the pitch angles $\theta_{1n}$ and $\theta_2$ is greater than 0.1 degree), processing then proceeds to step 224. The pitch angle $\theta_2$ ($\theta_{21}$) that is obtained while the vehicle is in a stable traveling state is stored in a storage section (RAM), and processing then returns to step 300. If NO is selected in step 220 (i.e., the calculation of the pitch angle $\theta_2$ in step 218 does not represent the first calculation), processing proceeds to step 226. The CPU 16 determines whether or not the calculation of the pitch angle $\theta_2$ in step 218 represents the second calculation. If YES is selected in step 226 (i.e., the calculation of the pitch angle $\theta_2$ represents the second calculation), processing proceeds to step 228. The second pitch angle $\theta_{22}$ is stored in the storage section (RAM), and processing returns to step 200.

In contrast, if NO is selected in step 226 (the calculation of the pitch angle $\theta_2$ does not represent the second calculation), processing returns to step 230. The CPU 16 determines whether or not the calculation of the pitch angle $\theta_2$ in step 318 represents the third calculation. If YES is selected in step 230 (i.e., the calculation of the pitch angle $\theta_2$ represents the third calculation), processing then proceeds to step 232. A third pitch angle $\theta_{23}$ obtained while the vehicle is in a stable traveling state is stored in the storage section (RAM), and processing returns to step 200. If NO is selected in step 230 (the calculation of the pitch angle $\theta_2$ represents not the third calculation but the fourth calculation), processing proceeds to step 234. A mean value of the pitch angles $\theta_{21}$, $\theta_{22}$, and $\theta_{23}$ obtained at the first through third states in which the vehicle travels stably, or a pitch angle which most frequently occurs, is selected as an optimum pitch angle. Processing then proceeds to step 204.

In step 208, a signal is output to the motor driver 18 on the basis of the optimum pitch angle so as to activate the motor 10, and processing returns to step 200.

If YES is selected in step 310 (the pitch angle is corrected at the time of travel of the vehicle), or if NO is selected in any one of steps 212, 214, and 216 (when the vehicle speed is lower than the reference value, the acceleration is greater than the reference value, or a predetermined period of time has not yet elapsed), processing returns to step 200.

Figure 5:
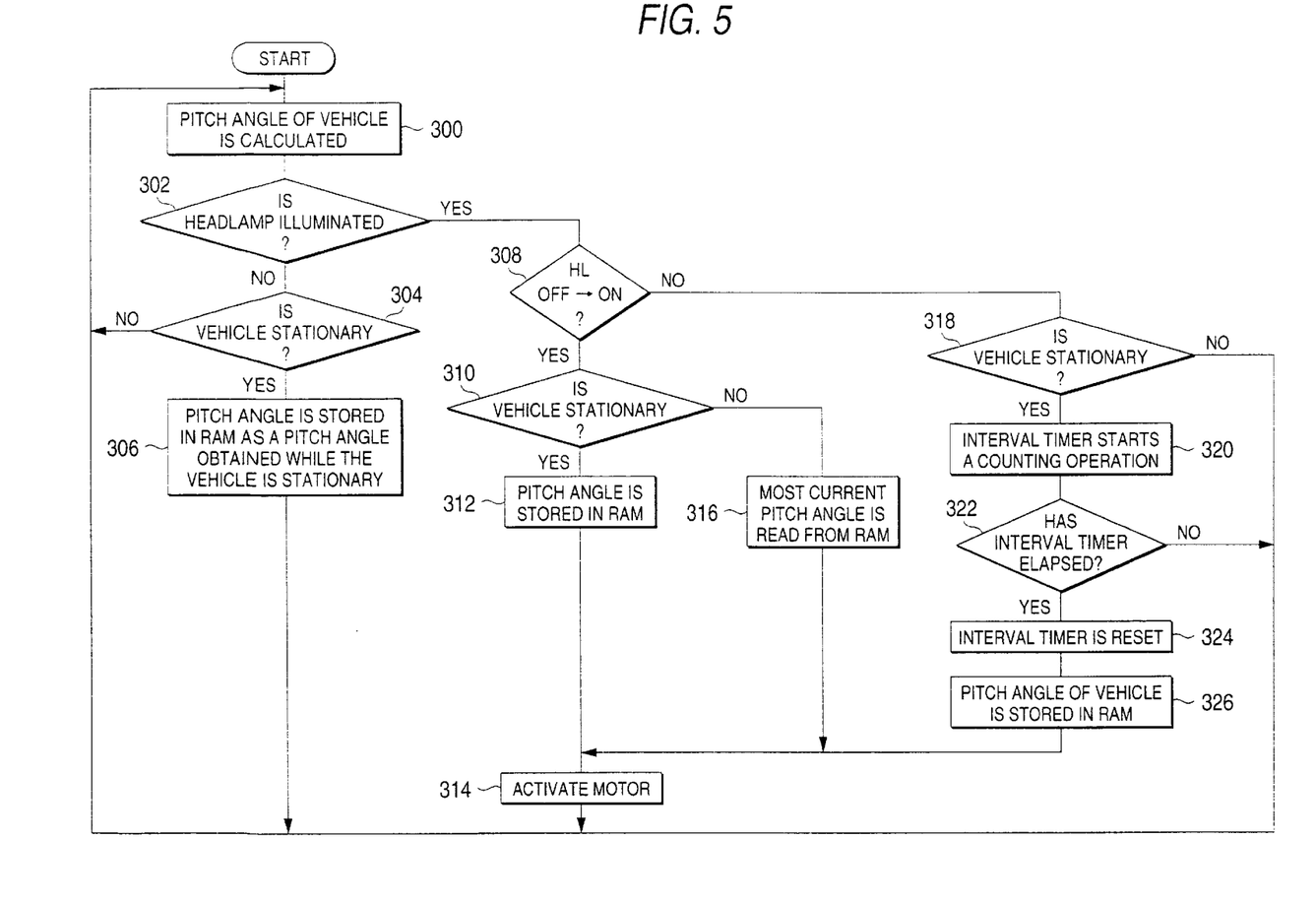
FIG. 5 is a flowchart showing a flow of operation relating to a control unit which serves as the principal section of a headlamp automatic leveling apparatus according to a third embodiment of the present invention.

FIG. 5 is a flowchart showing a flow of operation relating to a control unit which serves as the principal section of a headlamp automatic leveling apparatus according to a third embodiment of the present invention.

In the first embodiment, the operation of the motor 10 is controlled only while the vehicle is stationary or while the vehicle is traveling stably. However, in the third embodiment, the operation of the motor 10 is controlled only when the headlight ON/OFF switch 11 is in an ON position while the vehicle is stationary or while the vehicle is traveling.

In the third embodiment, the CPU 16 serving as a control unit calculates a pitch angle of the vehicle at all times regardless of whether the headlamp is illuminated or whether the vehicle is traveling. The thus-calculated pitch angle is stored in the storage section, i.e., RAM.

When the headlamp is extinguished while the motor 10 is being driven or while the vehicle travels, the control of operation of the motor 10 by the CPU 16 is interrupted. However, interruption of control of the alignment of light axis is not desirable in view of safety. In order to prevent occurrence of such a situation, even when the control of operation of the motor 10 is interrupted, the motor 10 (i.e., the light axis) is driven until it reaches a target position previously stored in the storage section, i.e., RAM.

The flow of control by the CPU 16 serving as a control unit is now described by reference to FIG. 5.

In step 300, on the basis of a signal output from the vehicle height sensor 14, the pitch angle of the CPU 16 is calculated. In step 302, a determination is made as to whether or not the headlamp is illuminated. If NO is selected in step 302 (the headlamp is extinguished), processing proceeds to step 304. On the basis of a signal output from the vehicle speed sensor 24, a determination is made as to whether the vehicle is traveling or stationary. If YES is selected in step 304 (the vehicle is stationary), processing proceeds to step 306. The pitch angle detected in step 300 is stored in the RAM serving as a storage section as a pitch angle obtained while the vehicle is stationary. Processing then returns to step 300. If NO is selected in step 306 (the vehicle is traveling), processing returns to step 300 without involvement of any operation.

In contrast, if YES is selected in step 302 (the headlamp is illuminated), processing proceeds to step 308. In this routine, a determination is made as to whether or not the headlight ON/OFF switch 11 is turned on. If YES is selected (the headlight ON/OFF switch is turned on), in step 310 a determination is made as to whether the vehicle is traveling or stationary. If YES is selected in step 310 (the vehicle is stationary), processing proceeds to step 312. The pitch angle detected in step 300 is stored in RAM, which serves as a storage section, as a pitch angle while the vehicle is stationary. In step 314, a signal is output to the motor driver 18 so as to activate the motor 10, and processing returns to step 300. The motor 10 is driven by an angle corresponding to the pitch angle stored in the RAM in step 312, thus effecting a leveling operation.

If NO is selected in step 310 (the vehicle is traveling), processing proceeds to step 316, where the most current pitch angle obtained while the vehicle is stationary is read from the RAM. In step 314, a signal is output to the motor driver 18 so as to drive the motor 10 on the basis of the thus-read pitch angle. Processing returns to step 300. The motor 10 is driven by an angle corresponding to the most current pitch angle stored in the RAM, thus performing a leveling operation.

In contrast, if NO is selected in step 308 (the headlight ON/OFF switch 11 is not in an ON position in the routine), processing proceeds to step 318, where a determination is made as to whether or not the vehicle is stationary or traveling. If YES is selected in step 318 (the vehicle is stationary), in step 320 the interval timer 17 starts a counting operation. In step 322, a determination is made as to whether or not the interval time (e.g., five seconds) has elapsed. If YES is selected in step 322 (five seconds have elapsed), in step 324 the interval timer 17 is reset. Processing proceeds to step 326, where the pitch angle (the pitch angle obtained while the vehicle stationary) detected in step 300 is stored in the RAM. In step 314, a signal is output to the motor driver 18 so as to activate the motor 10, and processing returns to step 300. As a result, the motor 10 is activated by only an angle corresponding to the pitch angle stored in the RAM, thus performing a leveling operation.

If NO is selected in step 318 (the vehicle is traveling), or if NO is selected in step 322 (five seconds have not yet elapsed), processing returns to step 300.

Figure 6:
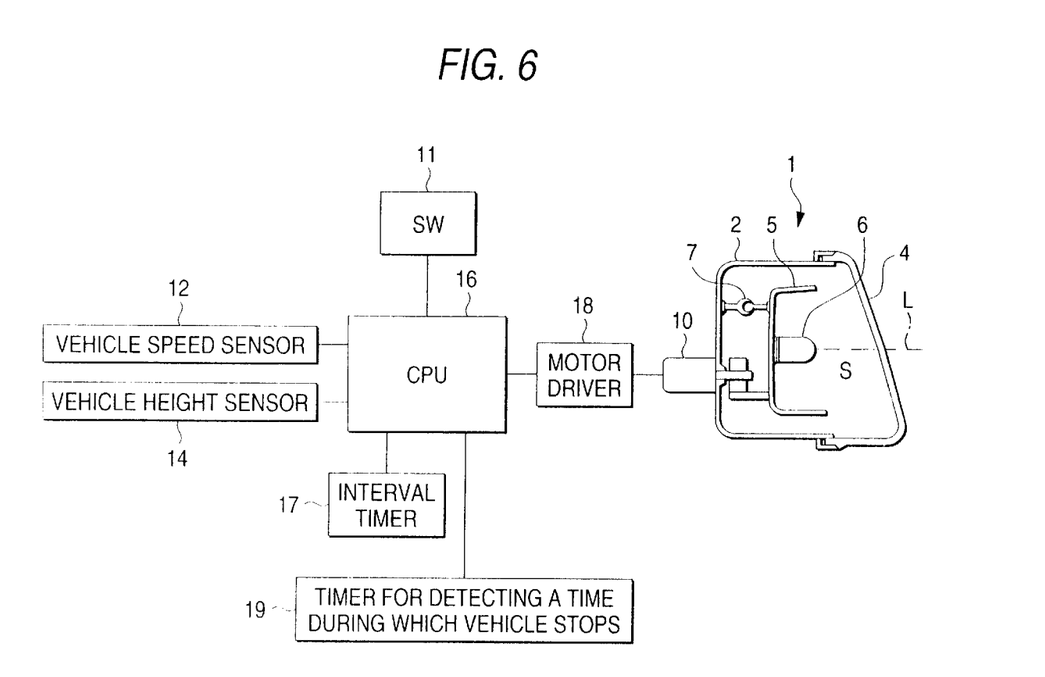
FIG. 6 is a view showing the overall configuration of an apparatus for automatically leveling automobile headlamps according to a fourth embodiment of the present invention.
Figure 7:
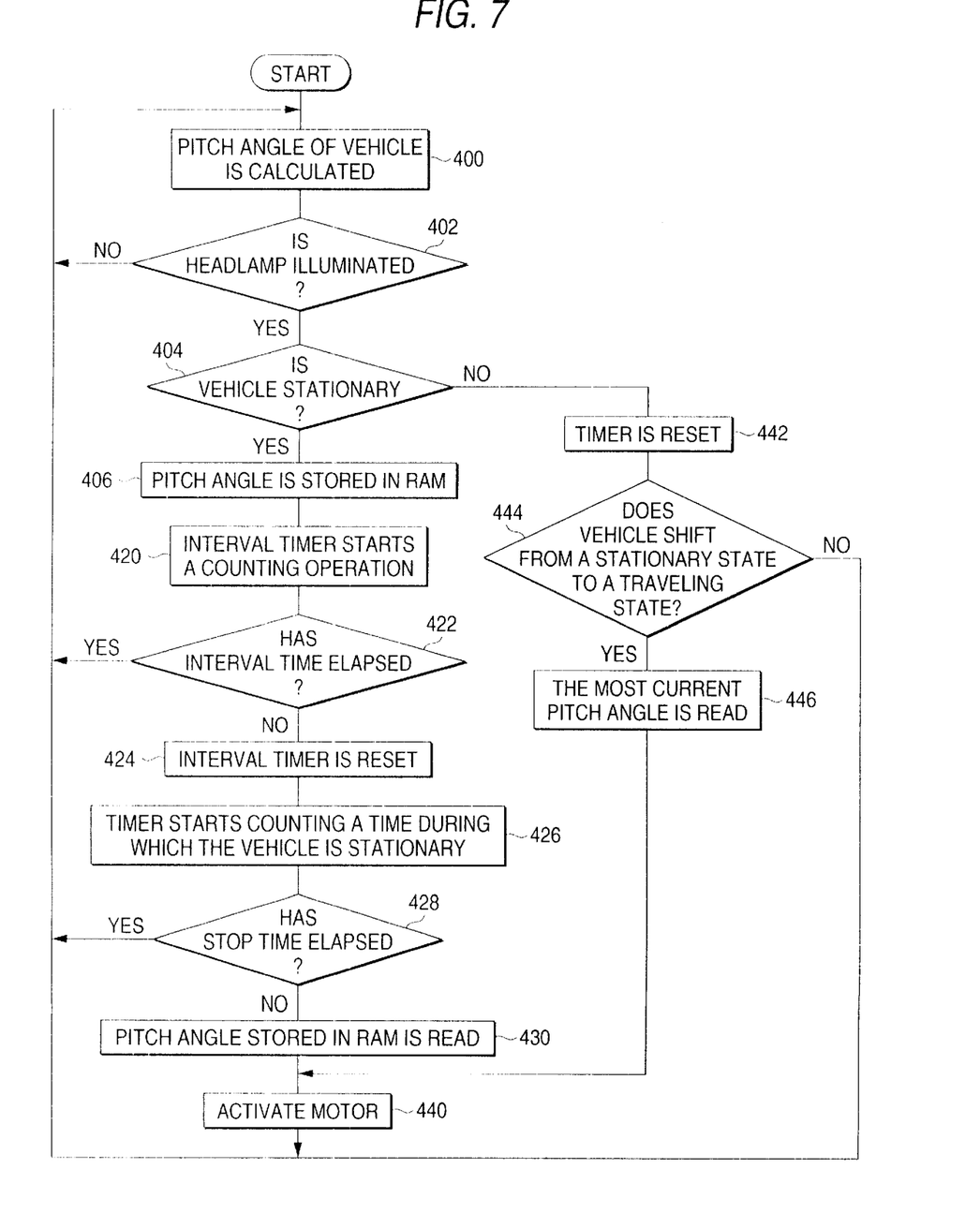
FIG. 7 is a flowchart showing the flow of operation relating to a control unit serving as the principal section of the automatic leveling apparatus.

FIGS. 6 and 7 show a headlamp automatic leveling apparatus according to a fourth embodiment of the present invention. FIG. 6 is a view showing the overall configuration of the apparatus, and FIG. 7 is a flowchart showing the flow of operation relating to a control unit serving as the principal section of the apparatus.

In the fourth embodiment, the operation of the motor 10 is controlled only when the vehicle is stationary. As shown in FIG. 6, the CPU 16 serving as a control unit is connected to a timer 19 for detecting a time during which the vehicle is stopped. If no signal is input to the CPU 16 from the vehicle speed sensor 12 for a given period of time, the timer 19 measures the period of time and stops the control of operation of the motor 10. If a signal is input to the CPU 16 from the vehicle speed sensor 12 while the control of operation of the motor 10 is suspended, the control of operation of the motor 10 is resumed immediately.

A signal is not input to the CPU 16 from the vehicle speed detection means for a predetermined period of time, because the vehicle speed sensor 12 operates falsely or the vehicle is actually stopped for a long period of time. In either case, the control of operation of the motor 10 serving as an actuator is not required. Hence, the CPU 16 stops the operation of the motor 10, thus avoiding useless activation of the motor 10.

When the vehicle shifts to a traveling state after having been remained in a stopped state for a long period of time, immediate release of the motor 10 from a suspended state and resumption of operation of the motor 10 are required. However, a leveling operation can be effected only while the vehicle is stopped. Even if the operation of the motor 10 is resumed, a leveling operation is substantially difficult to perform. At the beginning of resumption of the motor 10, the operation of the motor 10 can be controlled on the basis of the pitch angle stored in the storage section immediately before resumption of operation of the motor 10 or immediately before detection of a traveling state of the vehicle. Simultaneous with resumption of operation of the motor 10, an appropriate leveling operation can be performed without delay.

In step 400, on the basis of a signal output from the vehicle height sensor 14, the CPU 16 calculates a pitch angle of the vehicle. In step 402, a determination is made as to whether or not the headlamp is illuminated. If NO is selected (the headlamp is determined to be extinguished), processing returns to step 400. If YES is selected (the headlamp is determined to be illuminated), processing proceeds to step 404, where a determination is made as to whether the vehicle is stationary or traveling.

If in step 404 YES is selected (the vehicle is determined to be stationary), processing proceeds to step 406. The pitch angle (the pitch angle obtained while the vehicle is stationary) detected in step 400 is stored in the RAM. By way of the interval control steps comprising steps 420, 422, and 424, processing proceeds to step 426. In step 420, the interval timer 17 starts a counting operation, and in step 422 a determination is made as to whether or not the interval time (e.g., five seconds) has elapsed. If NO is selected (five seconds have not yet elapsed), processing returns to step 400. In contrast, if in step 422 YES is selected (five seconds have elapsed), the interval timer 17 is reset in step 424, and processing proceeds to step 426.

In step 426, the timer 19 starts counting a time during which the vehicle is stationary (hereinafter referred to as a "stop time"). In step 428, a determination is made as to whether or not the stop time has passed a predetermined time (for example, one minute). If NO is selected (one minute has not elapsed), processing proceeds to step 430, where the pitch angle stored in the RAM in step 406 is read. Processing then proceeds to step 440, and, on the basis of the thus-read pitch angle (the pitch angle obtained while the vehicle is stationary), a signal is output to the motor driver 18 in order to control the motor 10. Processing then returns to step 300. If YES is selected in step 428 (one minute has elapsed), processing returns to step 300 without controlling the operation of the motor 10.

If NO is selected in step 404 (the vehicle is traveling), processing proceeds to step 442, where the timer 19 is reset. Further, processing proceeds to step 444, where a determination is made as to whether or not the vehicle shifts from a stationary state to a traveling state by means of the routine. If YES is selected (the vehicle shifts from a stationary state to a traveling state), in step 446 the most recent pitch angle (obtained while the vehicle is stationary) stored in the RAM is read. In step 404, a signal is output to the motor driver 18 in order to activate the motor 10, and processing returns to step 400. The motor 10 is driven by only the angle corresponding to the most recent pitch angle (obtained while the vehicle is stationary), thus performing a leveling.

If NO is selected in step 444 (when the vehicle is not shifted from a stationary state to a traveling state, or when the vehicle continues to be traveling), processing returns to step 400 without activating the motor 10.

In the first through fourth embodiments, the interval time between operations of the actuator is described as five seconds. Further, in the first and second embodiments, calculation of the pitch angle of the vehicle while the vehicle is in a stable traveling state requires that the vehicle continues to travel at a speed of 30 km/h or more with an acceleration of 0.5 m/s$^2$ or less for more than three seconds. In the fourth embodiment, the control of operation of the actuator is interrupted by use of the stop time detection timer under conditions that the stop time passes one minute. However, the elements of the set of the conditions are illustrative, and the present invention is not limited to these requirements.

The previous embodiments pertain to the apparatus for automatically leveling a reflector-movable headlamp comprising the lamp body 2 mounted on the vehicle body and a refractor 5 attached to the lamp body 2 so as to be tiltable. The same also applies to the automatic leveling of a unit-movable headlamp comprising a lamp housing mounted on a vehicle body and a lamp body reflector unit attached to the lamp housing so as to be tiltable.

As is evident from the foregoing description, in the headlamp automatic leveling apparatus according to the first aspect of the present invention, the automatic leveling operation is started when the vehicle is stationary and when the vehicle is in a stable traveling state. The actuator performs automatic leveling operations only at given time intervals. Accordingly, the number of times the actuator is operated is small, resulting in reduced power conservation. Further, the constituent members of a drive mechanism undergo less abrasion. As a result, there is provided an inexpensive automatic headlamp leveling apparatus which operates correctly.

According to the second aspect of the present invention, the illuminating action of the headlamp serves as a leveling switch, thus affording great convenience to the driver.

According to the third aspect of the present invention, the actuator is activated at low frequencies, so as to provide an automatic leveling apparatus which operates correctly over a long period of time.

According to the fourth aspect of the present invention, even if the actuator becomes uncontrolled while being activated, the actuator is driven to a desired predetermined position, thus maintaining the light axis of the headlamp in an appropriate position in relation and eliminating safety hazards.

According to the fifth aspect of the present invention, the orientation (pitch angle) of the vehicle can be detected correctly, and hence the headlamp is subjected to an automatic leveling operation such that the light axis is held in an appropriate position in relation to the orientation of the vehicle.

According to the sixth aspect of the present invention, the headlamp is subjected to an automatic leveling operation immediately after illumination of the headlamp, thus ensuring safety driving.

According to the seventh aspect of the present invention, the useless activation of the actuator during halts can be prevented, thus lengthening the life of the actuator.

According to the eighth aspect of the present invention, when the vehicle starts traveling after having been in a stationary state for a long period of time, the control of operation of the actuator is resumed immediately. Further, the headlamp is immediately, automatically leveled, thus eliminating safety hazards.

According to the ninth aspect of the present invention, the pitch angle obtained while the vehicle is stationary is corrected during travel so as to become equal to the pitch angle obtained while the vehicle is in a safety driving state (i.e., on the basis of the pitch obtained while the vehicle is in a stable traveling state, the operation of the actuator is controlled). Therefore, the headlamp is automatically leveled correctly.

The actuator performs automatic leveling operations only while the vehicle is traveling stably. Accordingly, the number of times the actuator is operated is small, resulting in reduced power conservation. Further, the constituent members of a drive mechanism undergo less abrasion. As a result, there is provided an inexpensive automatic headlamp leveling apparatus which operates correctly.

It will be apparent to those skilled in the art that various modifications and variations can be made according to the present invention without departing from the spirit or scope of the invention. Thus, it is intended that the present invention cover the modifications and variations of the invention provided they come within the scope of the appended claims and their equivalents.

What is claimed is:

1. An automatic leveling apparatus for an automobile headlamp, comprising:

an actuator for tilting a light axis of a headlamp in upward and downward relation to a vehicle body;

a control unit for controlling the operation of the actuator;

vehicle speed detection means for detecting a speed of the vehicle; and pitch angle detection means for detecting a pitch angle of the vehicle, wherein the control unit controls the operation of the actuator in accordance with a detected pitch angle so that the light axis of the headlamp maintains a constant, predetermined angle in relation to a road surface, and wherein, while the vehicle is stationary, the control unit controls operation of the actuator at a time of initial illumination of the headlamp and at given time intervals.

2. The automatic leveling apparatus as defined in claim 1, wherein the operation of the actuator is initiated simultaneously with the initial illumination of the headlamp.

3. The automatic leveling apparatus as defined in claim 1, wherein the interval between operations of the actuator is set to be longer than a maximum time required by the actuator to perform a single leveling operation.

4. The automatic leveling apparatus as defined in claim 1, wherein if the actuator is brought into an uncontrolled state after the operation of the actuator has been initiated, the actuator continues to operate by an amount of operation instructed by the control unit immediately before the actuator was brought into the uncontrolled state.

5. The automobile headlamp automatic leveling apparatus as defined in claim 1, wherein the pitch angle detected by the pitch angle detection means is processed by the control unit as an amount of control operation required to activate the actuator, and wherein the pitch angle is receivable by the control unit between the interval periods of operation of the actuator, regardless of a status of the headlamp illumination.

6. The automobile headlamp automatic leveling apparatus as defined in claim 1, wherein the control unit comprises a storage section for storing a pitch angle detected by the pitch angle detection means, and the control unit controls the operation of the actuator on the basis of the pitch angle stored in the storage section immediately before illumination of the headlamp.

7. The automobile headlamp automatic leveling apparatus as defined in claim 1, wherein if a signal is not input to the control unit from the vehicle speed detection means over a predetermined period of time wile the vehicle is stationary, the control unit suspends operation of the actuator.

8. The automobile headlamp automatic leveling apparatus as defined in claim 7, wherein when a signal is input to the control unit from the vehicle speed detection means while the control of operation of the actuator is suspended, the control unit releases the actuator from a suspended state and controls the operation of the actuator on the basis of the pitch angle stored in the storage section of the control unit either immediately before resumption of operation of the actuator or immediately before detection of a traveling state.

9. The automobile headlamp automatic leveling apparatus as defined in claim 1, wherein the control unit controls the operation of the actuator during a stable traveling state of the vehicle, based on the pitch angle that is obtained while the vehicle is in the stable traveling state.

10. A method for automatically leveling an automobile headlamp with an automatic leveling apparatus which includes an actuator for tilting a light axis of a headlamp in upward and downward relation to a vehicle body, a control unit for controlling the operation of the actuator, vehicle speed detection means for detecting a speed of the vehicle, and pitch angle detection means for detecting a pitch angle of the vehicle, said method comprising the steps of:

controlling the operation of the actuator in accordance with a detected pitch angle so that the light axis of the headlamp maintains a constant, predetermined angle in relation to a road surface, and while the vehicle is stationary, controlling operation of the actuator at a time of initial illumination of the headlamp and at given time intervals.

* * * * *